Figure 1:
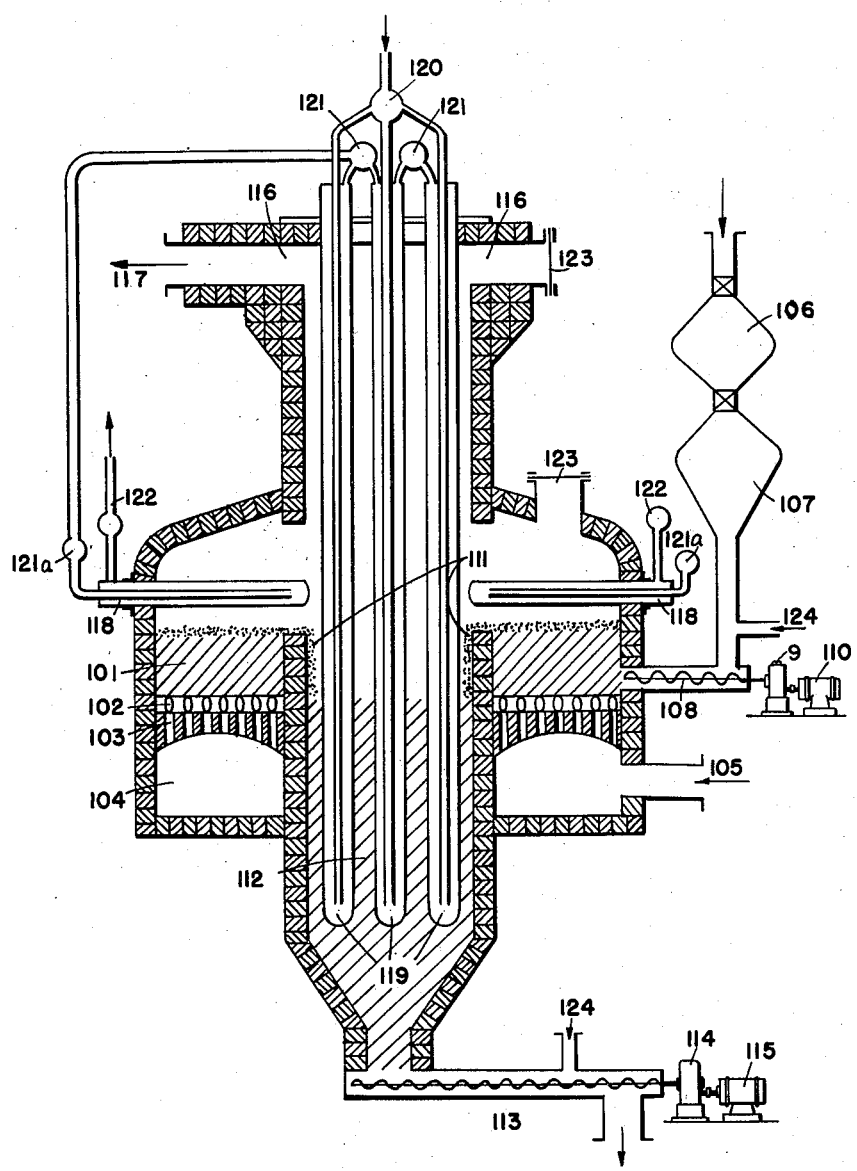

INVENTORS:
ADOLF JOHANNSEN
WILLI DANZ
WILHELM PFANNMUELLER
HERBERT WOLF 2,889,202

METHOD FOR PRODUCTION OF GASES CONTAINING SULFUR DIOXIDE

Adolf Johannsen, Ludwigshafen (Rhine), Willi Danz, Ludwigshafen (Rhine)-Oggersheim, Wilhelm Pfannmueller, Mannheim, and Herbert Wolf, Ludwigshafen (Rhine), Germany, assignors to Badische Anilin- & Soda-Fabrik Aktiengesellschaft, Ludwigshafen (Rhine), Germany Application November 24, 1950, Serial No. 197,196

Claims priority, application Germany November 24, 1949

1 Claim. (Cl. 23—177)

This invention relates to improvements in the production of gases containing sulfur dioxide by roasting sulfur-containing ores.

In the roasting of comminuted pyrites for the production of gases containing sulfur dioxide in the known mechanical roasting furnaces there is the danger, especially with a high throughput through the furnace, that in the material to be roasted, which is moving in countercurrent to the air for roasting, low-melting eutectic mixtures of iron sulfides and gangue may form locally which lead to a softening of the material to be roasted and give rise to agglomerations so that considerable trouble may be encountered, for example by sticking of the stirring arms or by the formation of annular deposits in rotary tubular furnaces. Such softenings may also arise when the iron pyrite is roasted in a layer which is kept in up and down whirling movement by means of the oxygen-containing gases necessary for the roasting which are led upwards through the comminuted material with the co-action of the gases formed in the strongly exothermic roasting reaction, the said layer being kept constantly in the same state of reaction by continuous or periodic supply of pyrite and withdrawal of roasted ore.

We have now found that in the said whirling layer the said troubles are avoided even with high throughputs if the roasting speed in the layer is increased to such an extent, by maintaining a sufficiently high temperature, that the layer consists predominantly of substantially roasted particles and if at the same time the temperature in the layer is not allowed to exceed the softening point of the substantially roasted material.

When employing iron pyrites poor in arsenic, which consists mainly of iron disulfide with an arsenic content of usually less than 2%, a sufficiently rapid roasting beyond the monosulfide stage can be obtained by keeping the temperature in the layer above the temperature of the conversion of iron disulfide into iron sulfide and sulfur, i.e. above about 690° C. If the pyrite particles enter the layer the temperature of which lies for example only 50° C. above the conversion polint, they rapidly acquire this temperature by reason of the extremely good heat exchange conditions, and as a consequence the sulfur is expelled as a vapor under a pressure of several atmospheres, frequently with decrepitation of the particles. The films of sulfur vapor surrounding the particles burn explosively with the introduced gases so that a local overheating of the particle takes place which leads to a very rapidly initiated combustion of the monosulfide remained in the particle, so that in a short time a roasted material is present which has been roasted substantially beyond the monosulfide stage which is further roasted, the more rapidly the higher the temperature is kept above the said lower limit but below the upper limit determined by the softening point of the substantially roasted material. Furthermore the said reactions due to their turbulent proceeding in this range of temperatures, have a favorable action on the formation of the whirling motion. Many of the particles are so much accelerated that they shoot up from the reaction layer like rockets.

The temperature in the whirling layer may be kept deliberately above the softening point of the roasted intermediate product having the lowest melting point. This measure leads not only to a specially rapid course of the roasting process, but also allows of almost entirely suppressing the undesirable oxidation of the sulfur dioxide to sulfur trioxide which otherwise occurs to a subordinate extent.

The temperatures to be maintained are dependent on the chemical constitution and the structure of the ores to be processed. The softening points of the roasted ore and of the intermediate roasted products with the lower melting points may readily be determined for each kind of ore. By reason of the content of gangue and embedded accompanying minerals, these temperatures often lie considerably below the melting points of the pure forms of the roasted products occurring consecutively during the roasting process, for iron sulfide melts at 1195° C. and iron-3-oxide at about 1570° C. However, the temperatures of about 900° C. measured in the usual way in the reaction layer can be considerably exceeded especially in the case of ores containing zinc sulfide, it being borne in mind that locally at the single particles considerably higher temperatures occur temporarily.

A special advantage of the present process lies in the fact that the reaction at these higher temperatures can be carried out exclusively in vessels lined with highly refractory material and that no mechanical devices made of metallic material are necessary in order to agitate the material to be roasted within the highly heated whirling layer.

When operating on a large scale the roasting of the pyrites in the whirling layer proceed almost adiabatically because the heat loss in this compact-deviced arrangement within a refractory brickwork can be practically disregarded. The regulation of the temperature within the layer according to the above-mentioned points of view, which is necessary in particular in the preparation of roaster gases having a high content of sulfur dioxide, may, however, be carried out in a simple manner by introducing into the layer solid or gaseous substances, for example by returning to the roasting zone a part of the roaster gases produced or of the roasted ore after cooling. The return of the cooled roasted ore and/or of the flue dust has been found to be especially advantageous because in this way a further reduction in the concentration of the intermediate products of the roasting process which tend to softening is obtained and an economical utilization of the heat withdrawn with the roasted ore is readily possible.

A further possibility for regulating the temperature within the roasting layer consists in introducing into the layer sulfur-containing substances, preferably such as do not melt at the roasting temperature, which form sulfur dioxide by an endothermic reaction under the roasting conditions. Among such substances there may be mentioned for example iron sulfate, gypsum, anhydrite and kieserite.

The excess of the reaction heat which is not necessary for the maintenance of the reaction temperature within the above explained range may be withdrawn also by cooling devices which are arranged in the reaction layer or are arranged in some other way which permits a withdrawal of heat.

Two or more of the said measures for regulating the temperature may also be used together.

An efficient cooling may be effected by withdrawing the radiant heat originating from the surface of the layer and utilizing it; this is preferably done by using the heat for producing steam. In this way the danger of softening and slagging of the material to be roasted is avoided and a regulated continuous withdrawal of the roasted ore from the layer ensured and moreover, as a result of the withdrawal of heat at the radiating surface of the layer, the heat convection movements within the layer are enhanced. The member which absorbs the radiant heat and which is preferably deviced for the production or superheating of high tension steam, is advantageously arranged parallel to the radiating surface or inclined to the radiating surface at such an angle that no deposits of dust can form, i.e. substantially transversely to the direction of flow of the hot reaction gases.

If it is desired simultaneously to absorb the sensible heat carried by the slowly flowing roaster gases by convection, heat exchange tubes for the production or superheating of steam are arranged parallel to the direction of flow of the roaster gases, and it is advantageous to cause an increase in the speed of the gas at the said tubes by constrictions of the flow cross-section. The members for the convective withdrawal of heat from the reaction gases may also be arranged outside the reaction system. It is preferable that the speed of flow of the gases at the heat-absorbing members should not be substantially greater than about 8 metres per second (calculated on the average temperature) in order to avoid strong erosion of the members by the dust entrained by the gases.

Since the roasted ore from iron pyrites, excluding the flue dust formation, amounts to about 50% of the initial material and thus withdraws a considerable part of the developed heat from the layer, it is advantageous also to make use of the sensible heat of the roasted ore by leading it through a heat exchange apparatus which is constructed as a steam superheater, steam producer or preheater for boiler feed water. In this way the degree of thermal efficiency of the process for the recovery of steam is still further considerably increased. The various steam producing and steam superheating tubes are preferably collected in a coherent plant.

The invention will now be further described with reference to Figure 1 of the accompanying drawings. Figure 1 shows an embodiment of apparatus for a very efficient withdrawal and utilization of the heat. The apparatus consists essentially of an annular chamber 101 with walls of refractory material for the reception of the finely grained material to be roasted below which is a layer of coarsely grained roasted ore 102; an annular grate 103) through which the air necessary for roasting coming from the tangential supply 105 is introduced through the wind channel 104; a central shaft 112 into which the roasted material overflows over the weir 111 from the annular chamber 101; and the heat withdrawing members 118 and 119. The comminuted iron pyrites is contained in the reservoir 106 and passes thence through an intermediate bunker 107 into the annular chamber by means of a conveyor worm 108 which is provided with a gear 9 and a motor 110. The roasted ore is withdrawn by means of a conveyor worm 113 with a gear 114 and a motor 115. The roaster gases collect in the annular channel 116 and leave through the pipes 117. In this arrangement the path for the passage of the roasted products through the zone of heat utilization is considerably constricted as compared with the cross-section of the roasting chamber.

The members 118 are constructed as steam superheating tubes, advantageously according to the Field system. In the radial direction they are uniformly distributed over the surface of the annular chamber and serve to absorb the radiant heat from the roasting layer and the heat reflected by the arched roof.

The members 119 are constructed as steam producing tubes, for example also according to the Field system. In the lower part of the central shaft they serve as a cooler for the roasted ore and in the upper part as a cooler for the roaster gas.

The water serving for the production of steam is distributed by means of a drum 120 to the tubes 119. The steam produced collects in the annular channel 121, flows via the ring chanel 121a into the tubes 118 and is withdrawn from the annular channel 122 in the superheated condition. In the event of injury to the steam tubes which are under pressure, the system is released from pressure by the automatic rupture of the discs 123. A weak current of air may be led in through pipes 124 to prevent the escape of roaster gases.

The abovementioned performance of the process in which a part of the roaster gases is returned to the layer for temperature regulation may also be carried out by using as the roaster gas oxygen instead of air in order to arrive at gases which are especially rich in sulfur dioxide. For this purpose the substantially cooled gas to be returned, which has preferably been used for the production of steam for the purpose of utilizing its sensible heat, is led together with the oxygen into the layer and a part of the roaster gas corresponding to the amount of oxygen added is withdrawn from circulation and led away for exploitation. The maintenance of temperatures below the softening point of the substantially roasted material may be effected in a simple manner by appropriate cooling of the circulating gases and by adjusting the addition of oxygen to the gas so that the heat of reaction produced by the practically complete reaction of the oxygen is only sufficient to maintain the roasting temperature and to cover the slight loss of heat by radiation and evaporation of the water contained in the iron pyrites introduced. When working up iron pyrites having a sulfur content of 40 to 50 percent, the oxygen content of the gases entering the whirling layer is adjusted to about 12 to 20 percent.

The process may be carried out for example as follows:

530 kilograms of Spanish iron pyrites per hour per square metre of base surface are introduced into a whirling layer which in the quiescent state has a height of about 50 centimetres and which consists of substantially roasted material. The pyrites has a sulfur content of about 48 percent and a grain size up to 4 millimetres. Through the distributor grate below the layer there are introduced per hour per square metre of surface 265 cubic metres of industrially pure oxygen mixed with 1090 cubic metres of high percentage sulfur dioxide gas which has been recovered from the process itself and which has been partially freed from dust and cooled. The roasting temperature amounts to 840° to 850° C. The roasted ore removed from the whirling layer contains 1.02 percent of sulfur and the dust entrained by the roaster gas contains 1.63 percent of sulfur. The gas obtained contains 91 percent of sulfur dioxide, 1 percent of oxygen and about 8 percent of nitrogen.

Larger additions of oxygen to the gas may be used if care is taken for an efficient withdrawal of the heat evolved in the reaction chamber, for example by spraying water into the layer or adding one or more of the above-described methods for regulating the temperature.

The process may be carried out not only with pure oxygen but also with industrial oxygen having an oxygen content of about 90 percent or more. The gases obtained then contain an admixture of up to about 10 percent of nitrogen.

Figure 2:
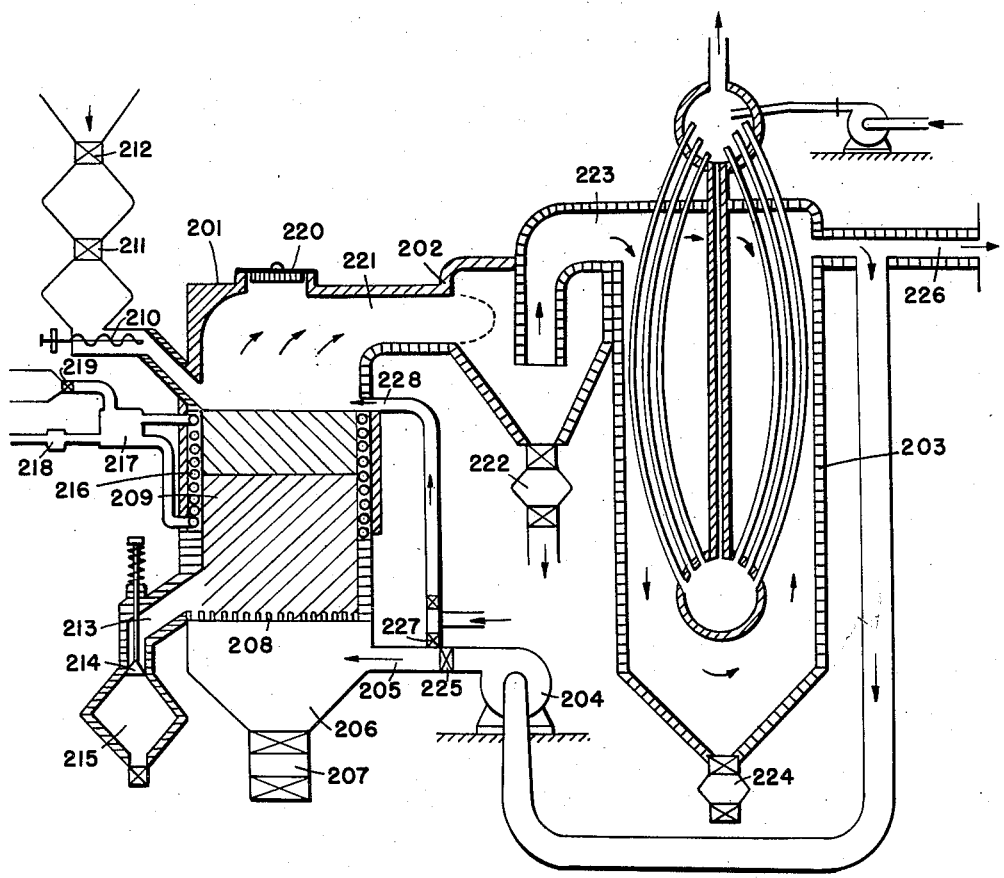

For carrying out the process an apparatus may be used such as is shown by way of example in Figure 2. The apparatus comprises a combination of a whirling layer roaster 201 with a dust-removing apparatus 202, a cooling device 203 constructed as a steam producer and a circulating blower 204. All the outlet openings for the roasted ore and flue dust are constructed as sluice closures in order to prevent the entry of atmospheric air and the escape of the highly concentrated sulfur dioxide gas. The same is true for the device for introducing the iron pyrites.

The circulating gas enters at 205 into a wind vessel 206. This is provided with a sluice closure 207 for the occasional removal of roast material dust falling from the whirling roaster through the grate 208. The gases enter the whirling layer 209 through the grate 208. The iron pyrites from the reservoir 211 is introduced by the supply device 210. The reservoir 211 is provided with a sluice 212 in order that the iron pyrites may be introduced without loss of gas. The roasted ore, in so far as it is not entrained as flue dust by the reaction gases, passes through the pipe 213 and the regulating device 214 into the sluice vessel 215 and may be withdrawn therefrom periodically.

The cylindrically wound pressure pipe 216 serves for withdrawing heat from the whirling layer. Water under high pressure circulates through this pipe. The circulation is effected by a pump 217 and fresh water under pressure is supplied by pump 218. The water is released from pressure by means of the valve 219 to an extent depending on the heat withdrawn and superheated steam thus obtained.

The interior of the apparatus is accessible to inspection through the opening 220 having a tightly closing cover.

The gases pass through pipes 221 tangentially into the dust-remover 202 which is constructed as a cyclone. The dust-remover 202 is provided with a sluice 222 for the withdrawal of the separated flue dust. Pipe 223 leads the gas into a cooling device 203 constructed for example as a circulation boiler. This is also provided with a sluice closure 224 for the purpose of withdrawing the flue dust which separates in the cooling device. The gases cooled to about 250° C. pass to the suction side of the blower 204 and, regulated by the valve 225, are returned in part to the whirling layer roaster. A part of the circulating gas corresponding to the supplied oxygen is withdrawn through a pipe 226 and led to a dust-removing device. The necessary oxygen is added to the circulating gas through a regulating valve 227. The parts of the apparatus which come into contact with the hot gases and the hot roasted material are coated with ceramic material.

When working up very finely grained minerals, as for example iron pyrites having a considerable content of particles smaller than 0.1 millimetre, or when employing whirling layers of small height, it is preferable to subject to a subsequent oxidation the constituents of the not yet completely reacted material which are carried away from the whirling layer by the hot gases. This oxidation is preferably carried out directly after the gases leave the whirling layer and for this purpose there is arranged above the whirling layer a chamber of fairly wide cross-section lined with refractory material. The gases flow through this chamber at such a low speed that the incompletely roasted dust contained in the gases and also the sulfur vapor which escapes in some cases from the layer during the preparation of roaster gases poor in oxygen is burnt with the additional formation of sulfur dioxide.

It may be advantageous to arrange insertions of refractory material in the combustion chamber, the said insertions serving to destroy for the greater part the inherent vis viva of the solid particles so that their dwell period in the after-combustion chamber is increased, and also to produce a whirling motion in the effluent gases. In this way, and by catalytic surface action of the insertions, the after-combustion is facilitated. Suitable insertions are for example two or more parallel baffle plates provided with openings for the passage of the gases, the openings in the individual baffle plates being staggered and widened conically in the direction of the gas flow in order to guard against deposition.

In order to render the after-combustion as complete as possible, additional amounts of oxygen-containing gas are as a rule led into the combustion chamber. This is advantageously effected by blowing directly on to the surface of the whirling layer of roasting material cold oxygen-containing gases, as for example cooled roaster gases which have been returned in a cycle, if necessary after the addition of oxygen or air.

In the apparatus shown in Figure 2, the branch pipe 228 serves for the introduction of oxygen directly above the whirling layer.

The shape of the inlet opening for this additional gas is preferably such that the gas can be directed to any part of the after-combustion chamber.

What we claim is:

In a process for the production of gases containing sulfur dioxide by roasting a sulfidic ore in a reaction layer consisting of both roasted and unroasted particles through which an oxygen-containing gas is passed upwardly to produce a random turbulent motion of the solid particles within the confines of the layer, the steps which comprise maintaining roasting conditions such that the layer consists predominantly of roasted particles, maintaining the temperature in the layer below the softening point of the substantially roasted material and above the softening point of the readily fusible intermediate products formed during roasting, cooling part of the roasted material, and returning the cooled part to the layer for regulation of the temperature therein.

References Cited in the file of this patent

UNITED STATES PATENTS

| | | |
|---|---|---|
| 1,941,592 | Bacon et al. | Jan. 2, 1934 |
| 2,030,627 | Freeman | Feb. 11, 1936 |
| 2,047,995 | Cordy et al. | July 21, 1936 |
| 2,074,061 | Mullen | Mar. 16, 1937 |
| 2,113,058 | Mullen | Apr. 5, 1938 |
| 2,371,619 | Hartley | Mar. 20, 1945 |
| 2,404,944 | Brassert | July 30, 1946 |
| 2,503,788 | White | Apr. 11, 1950 |
| 2,522,576 | Ingraham | Sept. 19, 1950 |
| 2,596,580 | McKay et al. | May 13, 1952 |
| 2,650,159 | Tarr et al. | Aug. 25, 1953 |

FOREIGN PATENTS

| | | |
|---|---|---|
| 505,631 | Great Britain | May 12, 1939 |
| 617,427 | Great Britain | Feb. 7, 1949 |

OTHER REFERENCES

Chemical and Metallurgical Engineering, June 1944. Pages 94–98.

Chemical Engineering, December 1947. Pages 112–115.

The Canadian Mining and Metallurgical Bulletin for April 1949, Montreal. Pages 178–187.

Engineering and Mining Journal, vol. 151, No. 3, March 1950. Pages 84–87.